(12) United States Patent
Loman et al.

(10) Patent No.: US 12,472,477 B2
(45) Date of Patent: Nov. 18, 2025

(54) CONTROL OF A FLOW GENERATOR IN A TANK

(71) Applicant: Xylem Europe GmbH, Schaffhausen (CH)

(72) Inventors: Peter Loman, Järfälla (SE); Ulf Carlsson, Täby (SE); Andrew Nicholas Dames, Cambridgeshire (GB)

(73) Assignee: Xylem Europe GmbH, Schaffhausen (CH)

( * ) Notice: Subject to any disclaimer, the term of this patent is extended or adjusted under 35 U.S.C. 154(b) by 555 days.

(21) Appl. No.: 17/924,046

(22) PCT Filed: May 19, 2021

(86) PCT No.: PCT/EP2021/063244
§ 371 (c)(1),
(2) Date: Nov. 8, 2022

(87) PCT Pub. No.: WO2021/233972
PCT Pub. Date: Nov. 25, 2021

(65) Prior Publication Data
US 2023/0182095 A1    Jun. 15, 2023

(30) Foreign Application Priority Data

May 20, 2020    (EP) .................................. 20175616

(51) Int. Cl.
*B01F 35/221*    (2022.01)
*B01F 27/113*    (2022.01)
(Continued)

(52) U.S. Cl.
CPC .... *B01F 35/221422* (2022.01); *B01F 27/113* (2022.01); *B01F 27/71* (2022.01);
(Continued)

(58) Field of Classification Search
CPC .............................................. B01F 35/221422
(Continued)

(56) References Cited

U.S. PATENT DOCUMENTS

| 2018/0023046 A1 | 1/2018 | Czwaluk |
| 2018/0057380 A1* | 3/2018 | Uby ...................... C02F 3/1284 |
| 2019/0060855 A1 | 2/2019 | Stewart et al. |

FOREIGN PATENT DOCUMENTS

WO    2016151471 A1    9/2016

OTHER PUBLICATIONS

International Search Report and Written Opinion for International Application No. PCT/EP2021/063244, dated Jul. 22, 2021, 10 pages.

* cited by examiner

*Primary Examiner* — David L Sorkin
(74) *Attorney, Agent, or Firm* — Buchanan Ingersoll & Rooney PC

(57) ABSTRACT

The invention relates to a method for controlling a flow generator (1) in a tank (20) configured for housing a liquid comprising solid matter, the flow generator (1) comprising an impeller and being located at a height (h-mixer) in the tank (20) and the tank (20) having a predetermined maximum filling height (h-max), wherein the flow generator (1) is configured to be operated at a variable operational speed (n) and the demand of operational speed (n-demand) is dependent on the present liquid level height (h-present) in the tank (20), wherein a max operational speed (n-max) of the flow generator (1) is the operational speed required when the liquid level in the tank (20) is equal to the maximum filling height (h-max), the present operational speed (n-present) being set equal to the demand of operational speed (n-demand) of the flow generator (1) that is determined using the formula:

(Continued)

$$(n-\text{present}) = (n-\text{demand}) = \frac{(n-\text{max})}{\left[(h-\text{max})/(h-\text{present})\right]^{\wedge}a}$$

at least when [(h-mixer)+X]≤(h-present)≤(h-max), wherein a≥(¼) and a<1, X=radius of the impeller of the flow generator+1, and all heights and measures are given in meter.

11 Claims, 2 Drawing Sheets

(51) Int. Cl.
  *B01F 27/71* (2022.01)
  *B01F 35/21* (2022.01)
  *B01F 35/32* (2022.01)
  *B01F 35/33* (2022.01)
  *E03F 5/26* (2006.01)
  *B01F 101/00* (2022.01)

(52) U.S. Cl.
  CPC ...... *B01F 35/2113* (2022.01); *B01F 35/3204* (2022.01); *B01F 35/33* (2022.01); *E03F 5/26* (2013.01); *B01F 2101/305* (2022.01); *B01F 2215/0409* (2013.01)

(58) Field of Classification Search
  USPC .......................................................... 366/601
  See application file for complete search history.

CONTROL OF A FLOW GENERATOR IN A TANK

CROSS-REFERENCE TO RELATED APPLICATIONS

This application is the US National Phase of International Application No. PCT/EP2021/063244, filed May 19, 2021, which claims priority to European Application No. 20175616.0, filed May 20, 2020. The disclosures of these applications are incorporated herein by reference in their entireties for all purposes.

TECHNICAL FIELD OF THE INVENTION

The present invention relates generally to the field of submersible devices for agitating, mixing and/or moving liquid in a tank, and to methods for controlling the operation of such devices. The present invention relates specifically to the field of submersible flow generators, or mixers, for liquid comprising solid matter and to methods for controlling the operation of such flow generators in a tank configured for temporary storing the liquid comprising solid matter and to tanks comprising such flow generators. The present invention is especially used in wastewater and sewage applications such as treatment plants and racetracks.

BACKGROUND OF THE INVENTION

Some steps in treatment plant processes, such as influent buffer tanks, racetracks, etc., and other similar intermediate and/or treatment tanks/reservoirs within or outside a treatment plant, has a varying input flow into the tank resulting in different liquid level in the specific tank when the output flow from the tank is not the same as the input flow. The purpose of a buffer tank is to have a constant/even output flow to the next step in the treatment plant independently of the input flow rate. The input flow rate will vary over the day, over the week, over the year and depending on weather.

When the wastewater/sewage/surface water reaches the wastewater treatment plant, there is an initial screening for separating large objects from the liquid/slurry, thereafter the liquid/slurry reaches a buffer/arrival tank before entering the actual treatment steps.

The object of the buffer tank is to level out the input to the actual treatment steps in order to have a uniform and stable process in the subsequent treatment steps. Thus, the surface level in the buffer tank will fluctuate widely up and down during the day and week and due to rain, etc. The liquid/slurry after the initial screening and in the buffer tank still comprises heavy solid matter, such as sand and stones, that will easily settle/sediment but it is important that the solid matter does not settle/sediment until after it has left the buffer tank and entered a specific sedimentation tank. It is also important that lighter solid matter, often biological, is evenly distributed in the liquid volume. Thus, it is important in such tanks that the liquid comprising solid matter, e.g. sludge, has an as uniform and homogenous mixture as possible in order to optimize the process in the subsequent treatment steps, and to have a predictable waste load profile.

If solid matter would settle/sediment in the arrival/buffer tank, the tank needs to be cleaned by being emptied from liquid/slurry before the sediment can be removed. Thus, one understands that this is more or less impossible to conduct such cleaning without having parallel arrival tanks that each is oversized in order to manage to receive all incoming wastewater/sewage when one tank is cut off.

When there is much or maximum amount of liquid in the tank, the need for mixing is high, and when there is a small amount of liquid in the tank the need for mixing is low. If the amount of liquid is too small the output may be temporarily stopped and then the momentary need for mixing is none. In order to prevent settlement/sedimentation in the arrival tank, there is provided one or more mixers that are operated at high and constant operational speed in order to secure that no solid matter settle/sediment when the buffer tank is full. Thus, the energy consumption is much higher than actually needed most of the time since most of the time the surface level in the tank is below or even much below the maximum filling level.

Thus, despite this variation in need for mixing the mixer/flow generator is usually operated at a constant/maximum operational speed in order to prevent settling of solid matter and in order to secure as constant/even mixture of the output liquid as possible, causing unnecessary high power consumption over time.

The same or related problem of unnecessarily high power consumption in relation to momentary liquid/slurry volume in the tank is also existing in other tanks than buffer tanks, due to higher operational speed is used than needed when the liquid/slurry level is low in the specific tank.

OBJECT OF THE INVENTION

The present invention aims at obviating the aforementioned disadvantages and failings of previously known methods for controlling a flow generator in a tank, and at providing an improved method, tank and flow generator.

A primary object of the present invention is to provide an improved method for controlling a flow generator in a tank of the initially defined type wherein the liquid volume/level in the tank is changing/varying over time. It is another object of the present invention to provide a method for controlling a flow generator in a tank, in order to decrease the power consumption and at the same time secure a proper mixing of the liquid comprising solid matter. It is another object of the present invention to provide a method for controlling a flow generator in a tank in order to increase the operational life of the flow generator by not stressing the flow generator by not being operated at high/maximum operational speed.

SUMMARY OF THE INVENTION

According to the invention at least the primary object is attained by means of the initially defined method, tank and flow generator having the features defined in the independent claims. Preferred embodiments of the present invention are further defined in the dependent claims.

According to a first aspect of the present invention, there is provided a method for controlling a flow generator in a tank as initially defined, wherein the flow generator comprises an impeller and being located at a height (h-mixer) in the tank, wherein the tank has a predetermined maximum filling height (h-max), wherein the flow generator is configured to be operated at a variable operational speed (n) and the demand of operational speed (n-demand) is dependent on the present liquid level height (h-present) in the tank, wherein a max operational speed (n-max) of the flow generator is the operational speed required when the liquid level in the tank is equal to the maximum filling height (h-max), the present operational speed (n-present) being set equal to the demand of operational speed (n-demand) of the flow generator that is determined using the formula:

$$(n - \text{present}) = (n - \text{demand}) = \frac{(n - \text{max})}{\left[(h - \text{max})/(h - \text{present})\right]^{\wedge}a}$$

at least when [(h-mixer)+X]≤(h-present)≤(h-max), wherein a≥(¼) and a<1, X=radius of the impeller of the flow generator+1, and all heights and measures are given in meter.

According to a second aspect of the present invention, there is provided a tank configured for housing a liquid comprising solid matter, said tank comprising a flow generator and a control unit configured for operating the flow generator at variable operational speed (n) and height detection means for determining the present liquid level height (h-present) in the tank, wherein a max operational speed (n-max) of the flow generator is the operational speed required when the liquid level in the tank is equal to the maximum filling height (h-max), wherein the control unit is configured to set a present operational speed (n-present) of the flow generator equal to a demand of operational speed (n-demand) that is dependent on the present liquid level height (h-present), using the formula:

$$(n - \text{present}) = (n - \text{demand}) = \frac{(n - \text{max})}{\left[(h - \text{max})/(h - \text{present})\right]^{\wedge}a}$$

at least when [(h-mixer)+X]≤(h-present)≤(h-max), wherein a≥(¼) and a<1, X=radius of the impeller of the flow generator+1, and all heights and measures are given in meter.

According to a third aspect of the present invention, there is provided a flow generator suitable for such a tank, wherein the flow generator comprises an impeller and a stationary body having a drive unit, the impeller being connected to and driven in rotation by said drive unit. The flow generator comprises a control unit, wherein the flow generator is configured for being operated at variable operational speed (n) by the control unit, and in that the flow generator comprises a pressure sensor that is operatively connected to the drive unit, wherein the operational speed (n) of the flow generator is dependent on the present pressure (P-sensor) determined by the pressure sensor, the present pressure (P-sensor) being proportional to the present liquid level height (h-present), wherein a max operational speed (n-max) of the flow generator is the operational speed required when the liquid level in the tank is equal to the maximum filling height (h-max), wherein the control unit is configured to set a present operational speed (n-present) of the flow generator equal to a demand of operational speed (n-demand) that is dependent on the present liquid level height (h-present), using the formula:

$$(n - \text{present}) = (n - \text{demand}) = \frac{(n - \text{max})}{\left[(h - \text{max})/(h - \text{present})\right]^{\wedge}a}$$

at least when [(h-mixer)+X]≤(h-present)≤(h-max), wherein a≥(¼) and a<1,
X=radius of the impeller of the flow generator+1, and all heights and measures are given in meter.

Thus, the present invention is based on the insight that less liquid volume in a tank requires less thrust to agitate/mix the liquid and to keep the solid matter in the liquid suspended, and that increased liquid volume in a tank requires more thrust to agitate/mix the liquid and to keep the solid matter in the liquid suspended. Thus, the present invention is based on the understanding of the inventors that there is a predictable relationship between thrust need, i.e. operational speed of the flow generator/impeller, and the amount of liquid in the tank, i.e. liquid level. By determining/monitoring the momentary thrust need in a tank having varying liquid/slurry volume and controlling the operational speed of the flow generator accordingly, the object of minimizing the power consumption is achieved and the object of prolonging the operational life of the flow generator is achieved. The present invention is also based on the understanding that there is a relationship between pressure level in the tank and the amount of liquid in the tank, i.e. liquid level.

According to various embodiments of the present invention, the present operational speed (n-present) is set equal to a fixed value (n-fix) of the flow generator that is the operational speed required when the liquid level in the tank is equal to a predetermined filling height (h-fix) and that is determined using the formula:

$$(n - \text{present}) = (n - \text{fix}) = \frac{(n - \text{max})}{\left[(h - \text{max})/(h - \text{fix})\right]^{\wedge}a}$$

when (h-mixer)≤(h-present)≤(h-fix), and wherein (h-fix) ≤[(h-mixer)+X].

This means that when the liquid level is getting too close to the impeller of the flow generator, the general operational strategy is deviated from and the flow generator is operated at a fixed operational speed, i.e. not varying in dependence on further decreasing liquid level in the tank. Thus, when the blades of the impeller of the flow generator is near the liquid surface or cuts the liquid surface, the mixing effect will decrease radically but the flow generator is kept in operation, i.e. rotating impeller, in order not to be forced to start from standstill when the liquid level raises again and because a lower operational speed will not provide any useful mixing of the liquid but will only consume energy. When the liquid does not cover the flow generator body, the liquid will not provide cooling and the flow generator is preferably stopped.

According to various embodiments of the present invention, the flow generator is associated with a pressure sensor configured to determine the pressure (P-sensor) at the height (h-mixer) of the flow generator in the tank, wherein a height of liquid above the flow generator (h-above) is dependent on the present pressure (P-sensor), wherein the present liquid level height (h-present) in the tank is determined using the formula: (h-present)=(h-mixer)+(h-above).

According to various embodiments of the present invention, the height of liquid above the flow generator (h-above) is dependent on the sum of the present pressure (P-sensor) minus an air pressure deviation (ΔP-air), wherein the air pressure deviation (ΔP-air) is determined based on the present air pressure in relation to an air pressure (P-calibrate) existing during calibration of the pressure sensor.

Further advantages with and features of the invention will be apparent from the other dependent claims as well as from the following detailed description of preferred embodiments.

BRIEF DESCRIPTION OF THE DRAWINGS

A more complete understanding of the abovementioned and other features and advantages of the present invention will be apparent from the following detailed description of preferred embodiments in conjunction with the appended drawings, wherein.

DETAILED DESCRIPTION OF PREFERRED EMBODIMENTS OF THE INVENTION

Figure 1:
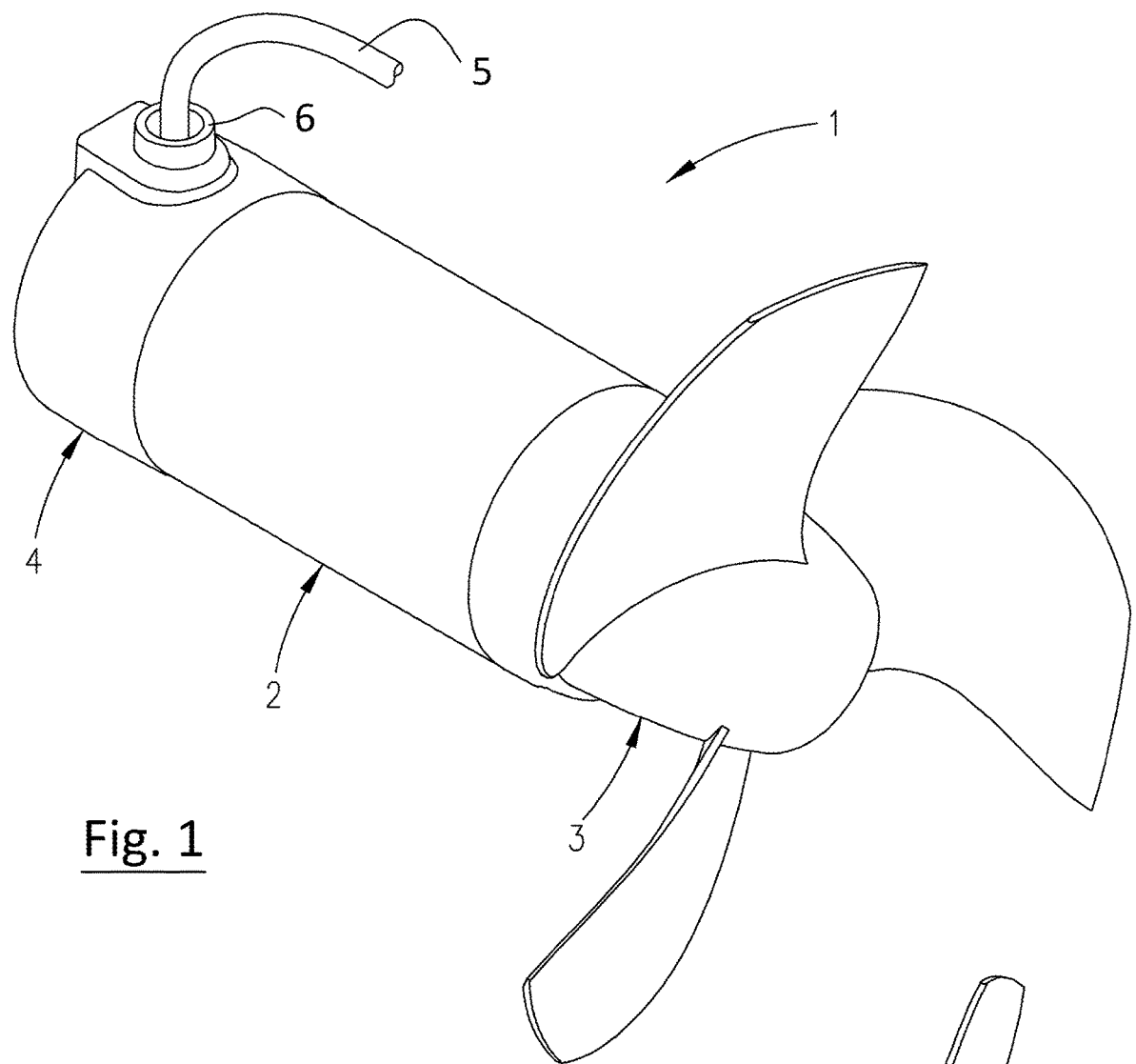
FIG. 1 is a schematic perspective view of an inventive flow generator.
Figure 2:
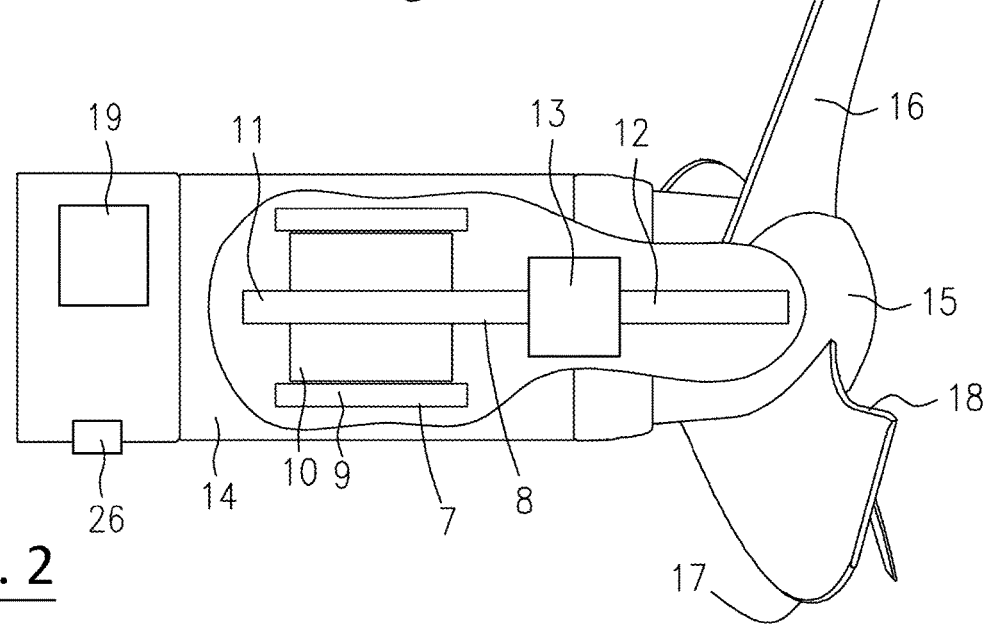
FIG. 2 is a schematic cross sectional side view of the flow generator according to FIG. 1.

Reference is initially made to FIGS. 1 and 2. The present invention relates especially to a flow generator or mixer, generally designated 1, suitable for treatment/transportation of liquid comprising solid matter, such as wastewater/sewage, and relates especially to a method for controlling such a flow generator 1.

The flow generator 1 is a submersible mixer machine and comprises three major parts, a stationary body, generally designated 2, a rotatable impeller/propeller 3 and a control unit 4. The control unit 4 controls a drive unit located inside the stationary body 2, the drive unit drives the impeller 3 in rotation and the impeller 3 propels the liquid, i.e. provides thrust to the liquid. The stationary body 2 and the impeller 3 are always part of the flow generator 1, and in the disclosed embodiment the control unit 4 is integrated into and constitutes a part of the flow generator. In an alternative embodiment the control unit 4 is constituted by a separate member and is operatively connected to the flow generator. The flow generator 1 is also called mixer machine or mixer. In the disclosed embodiment the flow generator is a submersible flow generator, i.e. configured to be located entirely submerged. However, it shall be pointed out that a submersible flow generator 1 can be partly located above the liquid surface during operation. The flow generator 1 is cooled by the liquid surrounding the stationary body 2.

An electric cable 5 extending from a power supply, for instance the power mains, provides power to the flow generator 1, the flow generator 1 comprising a liquid tight lead-through 6 receiving the electric cable 5. The electric cable 5 may also comprise signal wires for data communication between the flow generator and an external control unit (not shown).

In FIG. 2 some internal parts of the flow generator 1 are schematically disclosed. The drive unit comprises an electric motor, generally designated 7, and a drive shaft assembly 8 connected to and driven in rotation by said electric motor 7 during operation of the flow generator 1. The electric motor 7 comprises in a conventional way a stator 9 and a rotor 10. In the disclosed embodiment the drive shaft assembly 8 comprises a drive shaft 11, i.e. a rear end portion, and a propeller shaft 12, i.e. a forward end portion, wherein a mechanical transmission unit 13 is arranged between the drive shaft 11 and the propeller shaft 12. The rotor 10 is connected to and co-rotational with the drive shaft 11 of the drive shaft assembly 8. The impeller 3 is connected to and co-rotational with the propeller shaft 12 of the drive shaft assembly 8 in a conventional way. The transmission unit 13 has a fixed gear ratio wherein the impeller 3 has a lower rotational speed than the rotor 10 of the electric motor 7, i.e. reduced gearing. The gear ratio is preferably equal to or less than 100:1, more preferably equal to or less than 60:1, and preferably equal to or higher than 2:1, more preferably equal to or higher than 15:1. According to an alternative embodiment the gear ratio is 1:1, i.e. no gearing, the drive shaft 11 and the propeller shaft 12 being constituted by the same shaft member. The drive unit also comprises necessary bearings and seals (not shown). The rotational speed of the impeller/propeller 3, i.e. the operational speed of the flow generator 1, during normal operation of the flow generator 1 is equal to or less than 1000 rpm, and equal to or higher than 200 rpm.

In the disclosed embodiment the drive shaft 11 and the propeller shaft 12 both extends in an axial direction, and are preferably collinear. According to an alternative embodiment the mechanical transmission unit 13 is angled, i.e. it is an angle between the drive shaft 11 and the propeller shaft 12, for instance 90 degrees. In the latter case, the propeller shaft 12 extends in the axial direction.

The electric motor 7 is located in a housing 14 of the stationary body 2 and in the disclosed embodiment the impeller 3 is located in direct contact with the housing 14, the housing 14 being a liquid tight housing. However, in alternative embodiments the impeller 3 is located at a distance from the housing 14, i.e. the propeller shaft 12 of the drive shaft assembly 8 is visible between the housing 14 and impeller 3. According to the alternative embodiment the electric motor 7 may be located in a dry environment. In most applications the flow generator is a submersible flow generator, i.e. both the drive unit and the impeller 3 are located under the liquid surface during operation. In alternative embodiments the housing 14 and the electric motor 7 are not located in the liquid at the same time as the impeller 3 is located under the liquid surface, i.e. so-called top-entry or side-entry flow generators.

The impeller 3 comprises a hub 15 connected to the propeller shaft 12 of the drive shaft assembly 8 and a plurality of blades 16 connected to said hub 15, wherein the propeller shaft 12 extends in an axial direction and each blade 16 extends in a radial direction seen from its base to its top, wherein the blade 16 is connected to the hub 15 at its base and wherein the top of the blade 16 is the outermost part of the impeller 3. In the disclosed embodiment both the leading edge 17 and the trailing edge 18 of the blade 16 are curved, the leading edge 17 is convex and the trailing edge 18 is concave. It shall be pointed out that the blades 16 naturally also have an extension in the axial direction, i.e. has a pitch, in order to generate thrust to the liquid. The impeller 3 has a radius measured from the centre axis of the impeller 3 and propeller shaft 12 to the outermost part of the blades 16.

The control unit 4 is operatively connected to the electric motor 7, the control unit 4 being configured for monitoring and controlling the operation of the flow generator 1. The electric motor 7 is configured to be driven in operation by the control unit 4. Thus, the control unit 4 is configured to control the rotational speed at which said electric motor 7 of the mixer machine is to be driven, for instance by controlling the frequency of the current operating the electric motor 7. According to the disclosed embodiment, the control unit 4 comprises a Variable Frequency Drive (VFD) 19. Thus, the flow generator 1 is configured to be operated at variable operational speed (n). The control unit 4 is configured to perform the inventive method. Thus, the tank 20 comprises the control unit 4 that is configured for operating the flow generator 1 at variable operational speed (n), i.e. rpm of the impeller/propeller 3. The flow generator 1 is provided with a max operational speed (n-max) which is the operational speed, i.e. thrust, required when the liquid level in the tank 20 is equal to the maximum filling height (h-max), in order to obtain sufficient and appropriate mixing. It shall be pointed out that the specific flow generator 1 in a specific application may be dimensioned for operational speeds above said max operational speed (n-max), however when sizing the flow generator 1 one tries to have the smallest possible flow generator 1 capable of performing the necessary mixing in order to save costs.

Figure 3:
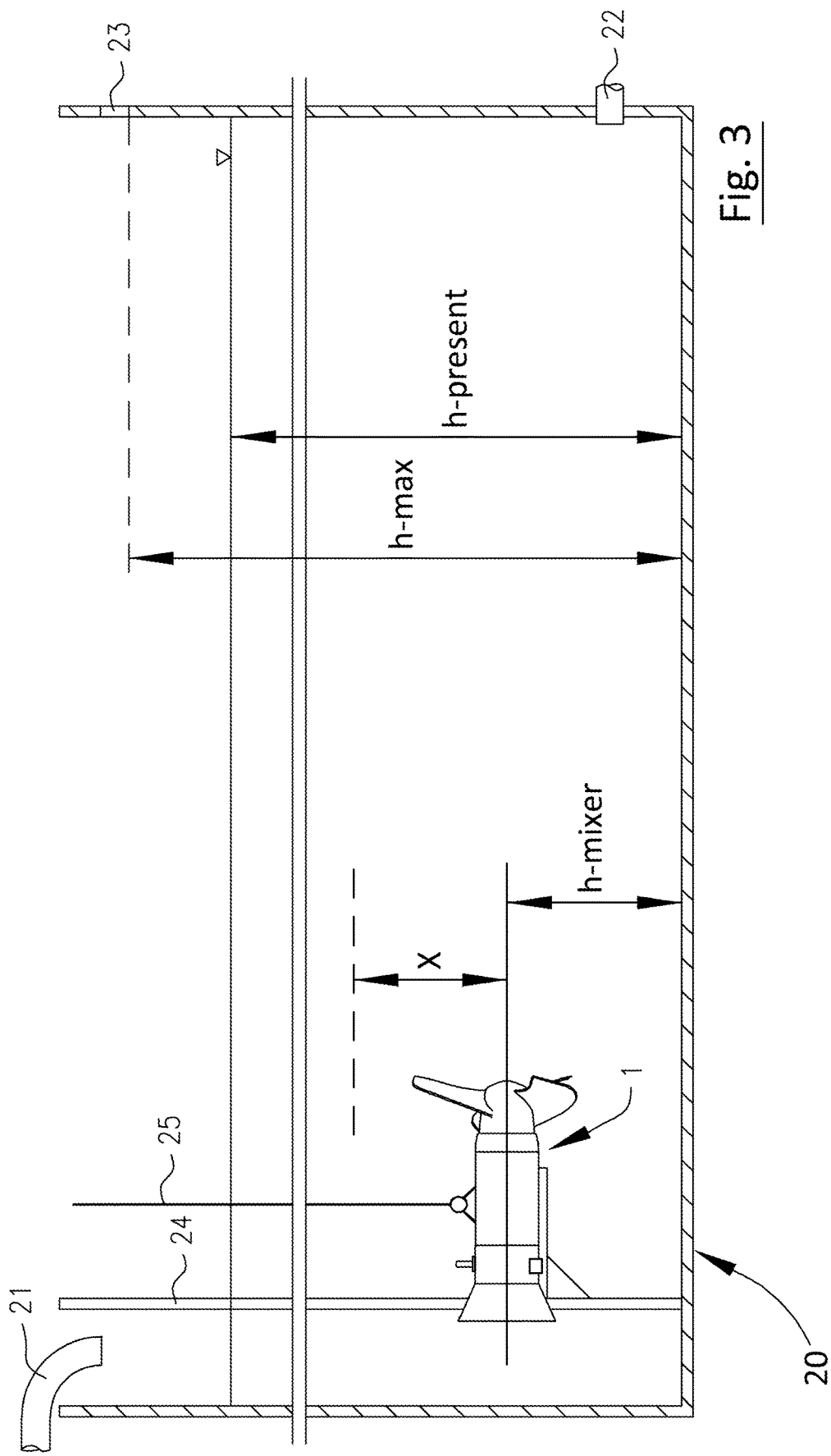
FIG. 3 is a schematic side view of a tank comprising such a flow generator.

Reference is now also made to FIG. 3, wherein the flow generator 1 is located in a tank 20 that is configured for housing the liquid comprising solid matter. The tank 20 comprises an inlet 21 to admit liquid to enter the tank 20 and an outlet 22 through which the liquid is removed/discharged from the tank 20. The liquid may be pumped into the tank 20 and/or arranged to flow by means of gravity into the tank 20, and the liquid may be pumped from the tank 20 and/or arranged to flow by means of gravity from the tank 20.

The tank/basin/reservoir 20 is for instance constituted by a buffer tank in a wastewater treatment plant. The tank 20 has a predetermined maximum filling height (h-max), for instance defined by the vertical distance between an overflow outlet 23 and the floor of the tank 20. The maximum filling height (h-max) is usually equal to or more than 4 meters and equal to or less than 15 meters.

The tank 20 may comprise several flow generators 1, wherein one or more are controlled in accordance with the present invention. The flow generator 1 is located at a height (h-mixer) in the tank 20, and the height of the flow generator 1 may be fixed or adjustable. In the disclosed embodiment the flow generator 1 is arranged to be guided along and by means of a guide bar 24 by being hoisted or lowered in a chain/wire 25. The height (h-mixer) of the flow generator 1 is defined as the height of the centre axis of the impeller/propeller 3 of the flow generator 1 in relation to the floor of the tank 20. The maximum filling height (h-max), or maximum liquid level, is known and set by an operator/technician. The height of the flow generator (h-mixer), is either known and set by an operator/technician and/or automatically determined during hosting/lowering of the flow generator 1. For instance the operator may set a value equal to the maximum filling height (h-max) when the flow generator 1 is located at the maximum filling height (h-max) and then the control unit 4 determine how long distance the flow generator 1 is lowered along the guide bar 24, wherein the difference gives the height (h-mixer) of the flow generator. In the various embodiments the flow generator 1 is located at a fixed height the height of the flow generator (h-mixer) is known and set by the operator/technician. Also the chain/wire may have markings helping the operator/technician to set the correct height of the flow generator.

Thereto, the tank 20 comprises height detection means for determining the present liquid level height (h-present) in the tank 20. The height detection means may be constituted by a level sensor located in the tank 20, and can be constituted by a submerged level sensor or a dry installed level sensor, e.g. using ultrasound, radar, etc., hanging above the liquid level. In a preferred embodiment the level sensor is constituted by a pressure sensor 26 located in the tank 20 in a submerged position, most preferably the pressure sensor 26 is part of or connected to the flow generator 1. The pressure sensor 26 is operatively connected to the control unit 4 and the drive unit, wherein the operational speed (n) of the impeller 3 of the flow generator 1 is dependent on the present pressure (P-sensor) determined by the pressure sensor 26.

Thus, the pressure sensor 26 and control unit 4 are configured to determine the pressure (P-sensor) at the height (h-mixer) of the flow generator 1 in the tank 20, wherein the height of liquid above the flow generator (h-above) is dependent on the present pressure (P-sensor), wherein the present liquid level height (h-present) in the tank ( ) is determined using the formula: (h-present)=(h-mixer)+(h-above).

In the various embodiments the pressure sensor 26 is not located at the same level as the height (h-mixer) of the flow generator 1, the present pressure (P-sensor) plus/minus the difference in height between the location of the pressure sensor 26 and the height of the flow generator (h-mixer) is added to the height of the flow generator (h-mixer) in order to determine the present liquid level height (h-present).

Thus, the present liquid level height (h-present) is proportional to the present pressure (P-sensor) of the pressure sensor 26.

The control unit 4 is configured to set a present operational speed (n-present) of the flow generator 1 that is set equal to a demand of operational speed (n-demand) that is dependent on the present liquid level height (h-present) in the tank 20.

According to the inventive method the demand of operational speed (n-demand) of the flow generator 1 that is determined using the formula:

$$(n-\text{present}) = (n-\text{demand}) = \frac{(n-\text{max})}{\left[(h-\text{max})/(h-\text{present})\right]^{\wedge}a}$$

at least when [(h-mixer)+X]≤(h-present)≤(h-max), wherein a≥(¼) and a<1, X=radius of the impeller 3 of the flow generator+1, and all heights and measures are given in meter.

According to various embodiments a≥(⅓) and/or a≤⅔, and most preferably a=½. In theory there is a linear relationship between the liquid volume, i.e. liquid depth in the tank, and the thrust of the flow generator 1 needed to obtain required mixing, and there is a square relationship between the thrust of the flow generator 1 provided and the operational speed of the flow generator 1, i.e. rpm of the impeller 3. Thus, in theory the variable "a" should be equal to ½, however in a specific application the value of the variable "a" may be set/tuned by the operator/technician. Especially if the tank 20 has a non-uniform shape/area along the vertical direction, i.e. different areas at different depths and/or based on the nature of the specific liquid comprising solid matter, i.e. the sludge, in the tank 20. If the inventive solution should have linear decrease of the operational speed in relation to decreasing liquid level height, i.e. having the variable "a" equal to 1, this would entail a too low operational speed for performing the requested mixing task, i.e. too little thrust. Of course this applies more and more when the variable "a" is bigger than 1. If the variable "a" should be less than ¼ the operational speed would be too high and consume too much energy for performing the requested mixing task, i.e. too much thrust.

When the present liquid level height (h-present) is lowered too close towards the flow generator 1 and/or the flow generator 1 is hoisted too close towards the present liquid level height (h-present), the method preferably comprises the step of setting the present operational speed (n-present) equal to a fixed value (n-fix) of the flow generator 1 that is the operational speed required when the liquid level in the tank 20 is equal to a predetermined filling height (h-fix) and that is determined using the formula:

$$(n - \text{present}) = (n - \text{fix}) = \frac{(n - \text{max})}{\left[(h - \text{max})/(h - \text{fix})\right]^\wedge a}$$

when (h-mixer)≤(h-present)≤(h-fix), and wherein (h-fix) ≤[(h-mixer)+X].

Thus, an operational speed (n) below the fixed operational speed (n-fix) is not efficient and should be avoided, also in the cases when the blades of the impeller 3 cuts the liquid surface. Alternatively, the flow generator 1 is turned off when the present liquid level height (h-present) is equal to or less than said predetermined filling height (h-fix). According to a preferred embodiment the predetermined filling height (h-fix)=[(h-mixer)+X].

According to various embodiments the height of liquid above the flow generator (h-above) is dependent on the sum of the present pressure (P-sensor) minus an air pressure deviation (ΔP-air), wherein the air pressure deviation (ΔP-air) is determined based on the present air pressure in relation to an air pressure (P-calibrate) existing during calibration of the pressure sensor 26. The present air pressure is the air pressure acting on the liquid surface and may be measured on site or taken from weather forecast.

According to various embodiments the height of liquid above the flow generator (h-above) is dependent on the sum of the present pressure (P-sensor) minus the present air pressure. The present air pressure is the air pressure acting on the liquid surface and may be measured on site or taken from weather forecast.

A computer program product/package comprising instructions to cause the flow generator 1 to execute the steps of the above method, is accessible/available/operatively connected to the flow generator 1. Said computer program product is preferably located/run in the control unit 4.

Feasible Modifications of the Invention

The invention is not limited only to the embodiments described above and shown in the drawings, which primarily have an illustrative and exemplifying purpose. This) patent application is intended to cover all adjustments and variants of the preferred embodiments described herein, thus the present invention is defined by the wording of the appended claims and the equivalents thereof. Thus, the equipment may be modified in all kinds of ways within the scope of the appended claims.

The present invention is not limited to buffer tanks, but all tanks inside or outside a wastewater treatment plant, tanks for temporary storage of liquid and/or tanks for processing the liquid, are covered by the present application.

It shall also be pointed out that all information about/concerning terms such as above, under, upper, lower, etc., shall be interpreted/read having the equipment oriented according to the figures, having the drawings oriented such that the references can be properly read. Thus, such terms only indicates mutual relations in the shown embodiments, which relations may be changed if the inventive equipment is provided with another structure/design.

It shall also be pointed out that even thus it is not explicitly stated that features from a specific embodiment may be combined with features from another embodiment, the combination shall be considered obvious, if the combination is possible.

Throughout this specification and the claims which follows, unless the context requires otherwise, the word "comprise", and variations such as "comprises" or "comprising", will be understood to imply the inclusion of a stated integer or steps or group of integers or steps but not the exclusion of any other integer or step or group of integers or steps.

The invention claimed is:

1. A method for controlling a flow generator in a tank configured for housing a liquid comprising solid matter, the flow generator comprising an impeller located at a height (h-mixer) in the tank and the tank having a predetermined maximum filling height (h-max), the method comprising:
   operating the flow generator at a variable operational speed (n) with a demand of operational speed (n-demand) dependent on a present liquid level height (h-present) in the tank,
   wherein a max operational speed (n-max) of the flow generator is an operational speed required when a liquid level in the tank is equal to the maximum filling height (h-max), and a present operational speed (n-present) is set equal to a demand of operational speed (n-demand) of the flow generator determined using the formula:

$$(n - \text{present}) = (n - \text{demand}) = \frac{(n - \text{max})}{\left[(h - \text{max})/(h - \text{present})\right]^\wedge a}$$

at least when [(h-mixer)+X]≤(h-present)≤(h-max),
   wherein a≥(¼) and a<1,
   X=radius of the impeller of the flow generator+1, and
   all heights and measures are given in meters.

2. The method according to claim 1, wherein a≥(⅓) and/or a≤⅔.

3. The method according to claim 1, wherein the present operational speed (n-present) is set equal to a fixed value (n-fix) of the flow generator that is an operational speed required when the liquid level in the tank is equal to a predetermined filling height (h-fix) and that is determined using a formula:

$$(n - \text{present}) = (n - \text{fix}) = \frac{(n - \text{max})}{\left[(h - \text{max})/(h - \text{fix})\right]^\wedge a}$$

when (h-mixer)≤(h-present)≤(h-fix), and
   wherein (h-fix)≤[(h-mixer)+X].

4. The method according to claim 3, wherein (h-fix)=[(h-mixer)+X].

5. The method according to claim 1, wherein the flow generator is associated with a pressure sensor configured to determine a present pressure (P-sensor) at the height (h-mixer) of the flow generator in the tank, wherein a height of liquid above the flow generator (h-above) is dependent on the present pressure (P-sensor), wherein a present liquid level height (h-present) in the tank is determined using the formula: (h-present)=(h-mixer)+(h-above).

6. The method according to claim 5, wherein the height of liquid above the flow generator (h-above) is dependent on the sum of the present pressure (P-sensor) minus an air pressure deviation (ΔP-air), wherein the air pressure deviation (ΔP-air) is determined based on a present air pressure in relation to an air pressure (P-calibrate) existing during calibration of the pressure sensor.

7. A tank configured for housing a liquid comprising solid matter, comprising:

a flow generator having an impeller located at a height (h-mixer) in the tank, the tank having a predetermined maximum filling height (h-max);

a control unit configured for operating the flow generator at a variable operational speed (n); and height detection means for determining a present liquid level height (h-present) in the tank, wherein a max operational speed (n-max) of the flow generator is the operational speed required when a liquid level in the tank is equal to the maximum filling height (h-max), wherein the control unit is configured to set a present operational speed (n-present) of the flow generator equal to a demand of operational speed (n-demand) that is dependent on the present liquid level height (h-present), using the formula:

$$(n-\text{present}) = (n-\text{demand}) = \frac{(n-\text{max})}{\left[(h-\text{max})/(h-\text{present})\right]^{\wedge}a}$$

at least when [(h-mixer)+X]≤(h-present)≤(h-max),
wherein a≥(¼) and a<1,
X=radius of the impeller of the flow generator+1, and
all heights and measures are given in meter.

8. The tank according to claim 7, wherein the demand of operational speed (n-demand) is dependent on the predetermined maximum filling height (h-max) and the max operational speed (n-max) of the flow generator that is the operational speed required when the liquid level in the tank is equal to the maximum filling height (h-max).

9. The tank according to claim 7, wherein the height detection means comprises a pressure sensor configured to determine a present pressure (P-sensor) at the height (h-mixer) of the flow generator in the tank, wherein the height of liquid above the flow generator (h-above) is dependent on the present pressure (P-sensor), wherein a present liquid level height (h-present) in the tank is determined using the formula: (h-present)=(h-mixer)+(h-above).

10. The tank according to claim 7, wherein the flow generator comprises an impeller and a stationary body having a drive unit, the impeller connected to and driven in rotation by said drive unit, and wherein the height detection means comprises a pressure sensor operatively connected to the drive unit, wherein a present pressure (P-sensor) determined by the pressure sensor is proportional to the present liquid level height (h-present).

11. A flow generator configured for operation in a tank, the flow generator comprising:

an impeller and a stationary body having a drive unit, the impeller connected to and driven in rotation by said drive unit;

a control unit, wherein the flow generator is configured for being operated at a variable operational speed (n) by the control unit; and a pressure sensor that is operatively connected to the drive unit, wherein the operational speed (n) of the flow generator is dependent on a present pressure (P-sensor) determined by the pressure sensor, the present pressure (P-sensor) being proportional to a present liquid level height (h-present) in the tank, wherein a max operational speed (n-max) of the flow generator is the operational speed required when the liquid level in the tank is equal to the maximum filling height (h-max) of the tank, wherein the control unit is configured to set a present operational speed (n-present) of the flow generator equal to a demand of operational speed (n-demand) that is dependent on the present liquid level height (h-present), using the formula:

$$(n-\text{present}) = (n-\text{demand}) = \frac{(n-\text{max})}{\left[(h-\text{max})/(h-\text{present})\right]^{\wedge}a}$$

at least when [(h-mixer)+X]≤(h-present)≤(h-max),
wherein a≥(¼) and a<1,
X=radius of the impeller of the flow generator+1, and
all heights and measures are given in meter.

\* \* \* \* \*